Patented Dec. 12, 1950

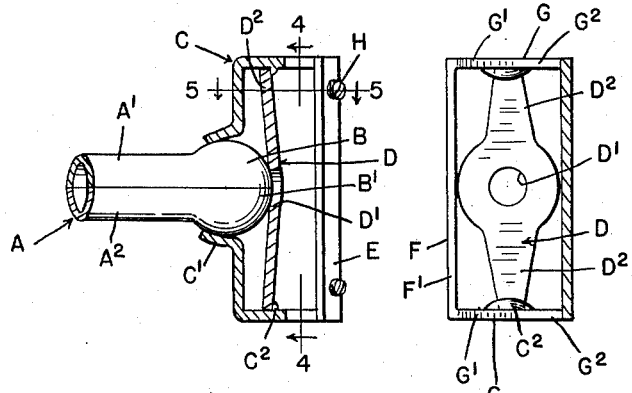
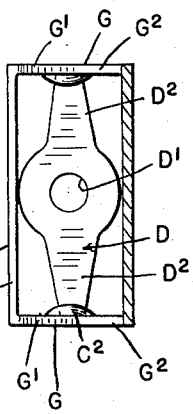
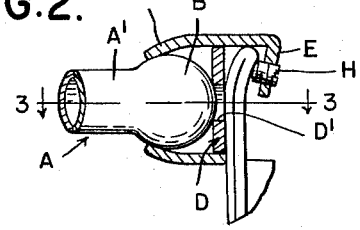
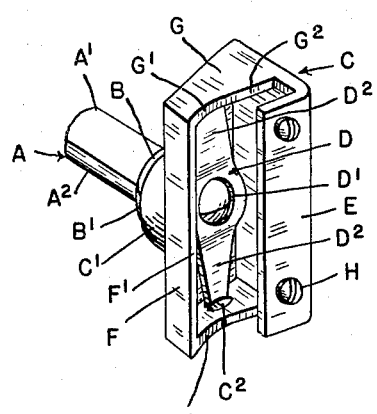
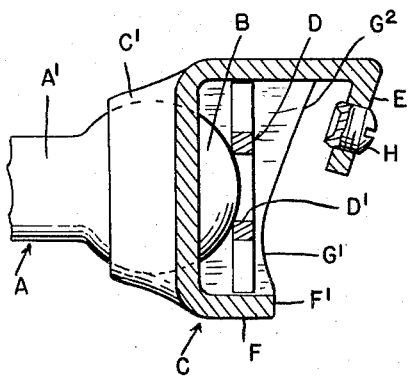
INVENTOR.
THOMAS C. WHITEHEAD

2,533,860

UNITED STATES PATENT OFFICE 2,533,860

ANGULARLY ADJUSTABLE BRACKET ARM MOUNTING

Thomas C. Whitehead, Detroit, Mich., assignor to Whitehead Stamping Company, Detroit, Mich., a corporation of Michigan Application February 2, 1948, Serial No. 5,723

9 Claims. (Cl. 248—226)

The invention relates to bracket arm supports such as used on motor vehicles for holding rear vision mirrors and other accessories. More particularly, the invention relates to that type of construction in which the bracket arm is mounted on the vehicle door, being secured to the flange of the hinge edge of said door.

It is the object of the invention to obtain a construction in which the mounting is more securely attached to the door flange so as to avoid danger of accidental displacement.

It is a further object to obtain a construction where the mounting in addition to forming an attachment means also forms a universal joint with the bracket arm so as to permit of moving the latter to various angles.

Still further it is an object of the invention to provide means for maintaining on the universal joint the required degree of friction sufficient to normally hold it from movement but, nevertheless, permitting of adjustment when desired. With these and other advantageous features in view, the invention consists in the construction as hereinafter set forth.

In the drawings:

Fig. 1 is a perspective view of my improved bracket arm mounting detached from the vehicle;

Fig. 2 is a horizontal section through the mounting in the central plane of the universal joint;

Fig. 3 is a section on line 3—3, Fig. 2, omitting the door flange;

Fig. 4 is a section on line 4—4, Fig. 3; and

Fig. 5 is an enlarged cross-section on line 5—5, Fig. 3.

As illustrated, A is the inner portion of the bracket arm, the outer portion and the device supported thereon being omitted. This bracket arm is preferably formed of complementary pressed sheet metal half sections A' and $A^2$ which meet in the longitudinal plane of the arm and are provided at their inner ends with substantially hemispherical portions B, B' of enlarged diameter. C is a hollow base member which may be formed from pressed sheet metal or from a folded sheet metal blank. This member includes a segmental spherical socket C' for engaging the hemispherical portions B, B' when the latter are within the hollow member, said socket being of sufficient diameter at its outer end to permit the desired range of angular adjustment of the arm A. Inside of the hollow member C is a resilient plate D, the central portion of which is apertured at D' to form an annular bearing for the spherical ends of the portions B, B'. The plate D is secured within the hollow base member C by having its opposite ends engaged with inwardly projecting shoulders $C^2$ on the corresponding ends of said member C. To permit of engagement with said shoulders, the opposite end portions $D^2$ of the plate D are reduced in width so that by placing said plate at an oblique angle said end portions can be pressed inward beyond the shoulders and then turned into engagement therewith. Thus the plate D is sufficiently tensioned to produce the desired friction on the spherical portion of the arm A to hold the latter in adjusted position.

The member C is secured to the flange of the vehicle door by means of a return bent flange E on one of the vertical sides of said member. The opposite vertical side F of the member C has its edge F' of a contour corresponding to the surface of the vehicle door against which it is to be placed. The top and bottom flanges G each has a portion G' of its edge also conforming to the surface of the door but with another portion $G^2$ which extends obliquely inward (with respect to the door). The return bent flange E is substantially parallel to this portion $G^2$. Thus if the door flange is inserted between the portions $G^2$ and E and pressure is then applied thereto, it will bend or kink said flange thereby forming a more secure fastening for the bracket arm. For producing such pressure, set screws H engage threaded apertures in the flange E and when these screws are adjusted they will clamp the door flange against the edge portions $G^2$. This will produce the necessary clamping and the set screws, which are provided with annular sharp edges, will also cut into the door flange.

With the construction as described, the member C is readily mounted upon the door and, when secured by the set screws H, will be held in rigid fixed relation thereto. The arm A, however, is angularly adjustable in all directions and the friction produced by the resilient pressure of the plate D will hold the arm in each position of adjustment. However, this friction is not high enough to prevent the operator from adjusting the angle of the arm whenever necessary.

What I claim as my invention is:

1. A bracket arm provided with a hollow base member having a marginal flange fashioned for edge contact with and conforming generally to the contour of the surface of a member on which said arm is to be mounted but with parallel spaced portions of said edge surface extending obliquely inward with respect to the mounting surface, a return bent flange on said base member spaced from and substantially parallel to said oblique portions adapted to embrace a portion of said mounting member, and a clamping screw threadedly engaging said flange for bearing against the embraced portion intermediate said spaced oblique portions to deform the same against said oblique surfaces and to secure said base thereto.

2. A bracket arm provided with a base member having a marginal flange fashioned for edge contact with and conforming generally to the contour of the surface of a member on which said arm is to be mounted, a return bent flange on said base member spaced from said marginal flange and adapted to embrace a portion of said mounting member, a clamping screw threadedly engaging said return bent flange to bear against the embraced portion of said mounting member and to secure said base member thereto, a segmental spherical socket on said base member, a spherical portion on the inner end of said arm engaging said socket to form a universal joint, and resilient friction means anchored within said base member for yieldably resisting angular movement of said arm.

3. A bracket arm provided with a base member having a marginal flange fashioned for edge contact with and conforming generally to the contour of the surface of a member on which said arm is to be mounted, a return bent flange on said base member spaced from said marginal flange and adapted to embrace a portion of said mounting member, a clamping screw threadedly engaging said return bent flange to bear against the embraced portion of said mounting member and to secure said base member thereto, a segmental spherical socket on said base member, a spherical portion on the inner end of said arm engaging said socket to form a universal joint, and a resilient member anchored within said hollow base member and bearing against said spherical portion to frictionally resist angular adjustment of said arm.

4. A bracket arm provided with a base member having a marginal flange fashioned for edge contact with and conforming generally to the contour of the surface of a member on which said arm is to be mounted, a return bent flange on said base member spaced from said marginal flange and adapted to embrace a portion of said mounting member, a clamping screw threadedly engaging said return bent flange to bear against the embraced portion of said mounting member and to secure said base member thereto, a segmental spherical socket on said base member, a spherical portion on the inner end of said arm engaging said socket to form a universal joint, and a resilient plate within said hollow base member anchored thereto at its opposite ends and centrally bearing against said spherical portion to frictionally resist angular movement of said arm.

5. A bracket arm provided with a base member having a marginal flange fashioned for edge contact with and conforming generally to the contour of the surface of a member on which said arm is to be mounted but with a portion extending obliquely inward with respect to the mounting surface, a return bent flange on said base member spaced from and substantially parallel to said oblique portion adapted to embrace a portion of said mounting member, a clamping screw engaging said flange for bearing against the embraced portion to deform the same against said oblique surface and to secure the base thereto, a segmental spherical socket on said base member, a spherical portion on said arm engaging said socket within said hollow base member, and a resilient plate also within said hollow base member having its opposite ends anchored thereto and centrally bearing against said spherical portion to frictionally resist angular movement of said arm.

6. A bracket arm construction comprising an arm having a spherical end portion, a hollow base member open at the rear and provided at said open rear thereof along a vertical side with an inwardly bent flange, a portion of said flange being spaced to the rear of said base member to embrace an edge portion of a member on which said arm is to be mounted and having threaded apertures therein, the front wall of said base member having a circular opening of a diameter slightly less than the diameter of said spherical portion, an edge of said opening forming a bearing for said spherical portion, opposite walls of said base member having inwardly projecting shoulders, means for frictionally holding said spherical portion in engagement with said bearing and to produce a frictional resistance to the angular movement of said arm, including a resilient plate within said base member, the central portion of said plate being apertured to form an annular bearing for said spherical portion, and opposite ends of said plate being engaged with said inwardly projecting shoulders, and means engaging the threaded apertures in said flange for clamping against said embraced portion of the member on which said arm is to be mounted.

7. A bracket arm construction comprising an arm having a spherical end portion, a hollow base member open at the rear and provided at said open rear thereof along a vertical side with an inwardly bent flange, a portion of said flange being spaced to the rear of said base member to embrace an edge portion of a member on which said arm is to be mounted and having threaded apertures therein, the front wall of said base member having a circular opening of a diameter slightly less than the diameter of said spherical portion, an edge of said opening forming a bearing for said spherical portion, opposite walls of said base member having inwardly projecting shoulders, means for frictionally holding said spherical portion in engagement with said bearing and to produce a frictional resistance to the angular movement of said arm, including a resilient plate within said base member, opposite ends of said plate being engaged with said inwardly projecting shoulders, and means engaging the threaded apertures in said flange for clamping against said embraced portion of the member on which said arm is to be mounted.

8. A bracket arm construction comprising an arm having a spherical end portion, a hollow base member open at the rear and provided at said open rear thereof along a vertical side with an inwardly bent flange, a portion of said flange being spaced to the rear of said base member to embrace an edge portion of a member on which said arm is to be mounted and having threaded apertures therein, the front wall of said base member having a circular opening of a diameter slightly less than the diameter of said spherical portion, an edge of said opening forming a bearing for said spherical portion, opposite walls of said base member having inwardly projecting shoulders, means for frictionally holding said spherical portion in engagement with said bearing and to produce a frictional resistance to the angular movement of said arm, including a resilient plate within said base member, opposite ends of said plate being engaged with the front of said inwardly projecting shoulders, opposite end portions of said plate being reduced in width so that by placing said plate at an oblique angle said end portions can be moved into and out of engagement with the front of said shoulders, and means engaging the threaded apertures in said flange for clamping against said embraced portion of the member on which said arm is to be mounted.

9. A bracket arm construction comprising an arm having a spherical end portion, a hollow base member open at the rear and provided at said open rear thereof along a vertical side with an inwardly bent flange, a portion of said flange extending obliquely inward and being spaced to the rear of said base member to embrace an edge portion of a member on which said arm is to be mounted, said flange portion having threaded apertures therein, means engaging the threaded apertures in said flange for exerting pressure against said embraced portion, portions of the rear edges of said base member at the top and bottom thereof being substantially parallel to the obliquely extending portion of the flange aforesaid, other rear edge portions of said base member being shaped to conform to the contour of the member on which said arm is to be mounted, said rear edge formation of the base member being such relative to said obliquely extending portion of said flange that a kink or bend is formed in said embraced portion when said pressure exerting means is applied thereto to thereby provide a more secure anchorage for said bracket arm.

THOMAS C. WHITEHEAD.

REFERENCES CITED

The following references are of record in the file of this patent:

UNITED STATES PATENTS

| Number | Name | Date |
|---|---|---|
| 2,082,596 | Ponce | June 1, 1937 |
| 2,189,667 | Kries | Feb. 6, 1940 |
| 2,431,400 | Iverson | Nov. 25, 1947 |